(12) United States Patent
Ballard et al.

(10) Patent No.: US 8,598,096 B2
(45) Date of Patent: *Dec. 3, 2013

(54) PRECIPITATED WEIGHTING AGENTS FOR USE IN WELLBORE FLUIDS

(75) Inventors: David Antony Ballard, Aberdeenshire (GB); Jarrod Massam, Aberdeen (GB)

(73) Assignee: M-I L.L.C., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/447,729

(22) Filed: Apr. 16, 2012

(65) Prior Publication Data

US 2012/0202718 A1  Aug. 9, 2012

Related U.S. Application Data

(63) Continuation of application No. 12/440,706, filed as application No. PCT/US2007/078159 on Sep. 11, 2007, now Pat. No. 8,168,569.

(60) Provisional application No. 60/825,156, filed on Sep. 11, 2006.

(51) Int. Cl.
  *C09K 8/74* (2006.01)

(52) U.S. Cl.
  USPC .................................. 507/269; 166/305.1

(58) Field of Classification Search
  CPC ........................................................ C09K 8/74
  USPC ...................................... 507/269; 166/305.1
  See application file for complete search history.

(56) References Cited

U.S. PATENT DOCUMENTS

| | | | |
|---|---|---|---|
| 3,057,797 A * | 10/1962 | Anderson et al. ............. | 507/128 |
| 6,586,372 B1 | 7/2003 | Bradbury et al. | |
| 7,176,165 B2 | 2/2007 | Massam et al. | |
| 7,238,331 B2 | 7/2007 | Zhou et al. | |
| 7,267,291 B2 | 9/2007 | Bradbury et al. | |
| 7,449,431 B2 | 11/2008 | Bradbury et al. | |
| 7,538,074 B2 | 5/2009 | Bradbury et al. | |
| 7,589,049 B2 | 9/2009 | Bradbury et al. | |
| 7,618,927 B2 | 11/2009 | Massam et al. | |
| 7,651,040 B2 | 1/2010 | Bradbury et al. | |
| 7,651,983 B2 | 1/2010 | Massam et al. | |
| 7,727,939 B2 | 6/2010 | Bradbury et al. | |
| 7,745,380 B2 | 6/2010 | Bradbury et al. | |
| 8,168,569 B2 * | 5/2012 | Ballard et al. ................. | 507/269 |
| 2003/0124048 A1 | 7/2003 | Hardinghaus et al. | |
| 2004/0127366 A1 * | 7/2004 | Bradbury et al. ............. | 507/100 |
| 2004/0253170 A1 * | 12/2004 | Zhou et al. ................. | 423/592.1 |
| 2005/0013394 A1 | 1/2005 | Rausch et al. | |
| 2005/0101493 A1 | 5/2005 | Bradbury et al. | |
| 2005/0118742 A1 | 6/2005 | Henning et al. | |
| 2005/0139394 A1 | 6/2005 | Maurer et al. | |
| 2006/0188651 A1 | 8/2006 | Bradbury et al. | |
| 2007/0105724 A1 | 5/2007 | Massam et al. | |
| 2007/0105725 A1 | 5/2007 | Massam et al. | |
| 2007/0184987 A1 | 8/2007 | Bradbury et al. | |
| 2007/0281867 A1 | 12/2007 | Massam et al. | |
| 2007/0287637 A1 | 12/2007 | Bradbury et al. | |
| 2008/0064613 A1 | 3/2008 | Massam | |

FOREIGN PATENT DOCUMENTS

| | | |
|---|---|---|
| GB | 605173 A | 7/1948 |
| WO | 2005118742 A2 | 12/2005 |

OTHER PUBLICATIONS

Office Action issued in corresponding Chinese Application No. 200780041191.4 dated May 2, 2012 (4 pages).
Office Action issued in corresponding Chinese Application No. 200780041191.4 dated Jan. 23, 2013 (11 pages).
Office Action issued in corresponding Argentinean Application No. P 08 01 02282 dated Mar. 26, 2013 (4 pages).
Office Action, with English translation, issued in corresponding Chinese Application No. 200780033635.X dated May 6, 2013 (11 pages).
Office Action, with English translation, issued in corresponding Chinese Application No. 20088010279.5 dated Apr. 28, 2013 (6 pages).
Office Action, with English translation, issued in corresponding Chinese Application No. 200780041191.4 dated Jun. 5, 2013 (11 pages).
First Examination Report received in corresponding Indian Patent Application No. 2017/DELNP/2009, dated Jun. 11, 2013 (2 pages).
Louise Roedbro et al., The Design of High Performance Drill-In Fluids with a View to Maximizing Production; American Association of Drilling Engineers, AADE-07-NTCE-23 (2007) pp. 1-10.
PCT International Search Report dated Feb. 29, 2008 issued in Application No. PCT/US2007/078159 (4 pages).
PCT Written Opinion dated Feb. 29, 2008 issued in Application No. PCT/US2007/078159 (9 pages).
C.W. Blount, "Synthesis of barite, celestite, anglesite, witherite and strontianite from aqueous solutions" American Mineralogist, vol. 59, 1974, pp. 1209-1219.
Examiner's Report issued in Australian Application No. 2007296539 dated Jun. 2, 2010 (2 pages).
Office Action issued in Canadian Application No. 2,663,192 dated Jul. 29, 2010 (2 pages).
Office Action issued in New Zealand Application No. 575494 dated Aug. 3, 2010 (2 pages).
Office Action issued in European Application No. 07842243.3 dated Sep. 7, 2010 (5 pages).
Limin Qi, Helmut Colfen, and Markus Antonietti: "Control of Barite Morphology by Double-Hyrophilic Block Copolymers" Mater. Chem., vol. 12, No. 8, dated Jul. 29, 2000, pp. 2392-2403, DOI: 10.1021/cm0010405.

(Continued)

*Primary Examiner* — Alicia Toscano
(74) *Attorney, Agent, or Firm* — Osha Liang LLP

(57) ABSTRACT

A method of formulating a wellbore fluid that includes precipitating a weighting agent from a solution; and adding the precipitated weighting agent to a base fluid to form a wellbore fluid is disclosed. Fluids and methods of formulating wellbore fluids that contain dispersant coated precipitated weighting agents are also disclosed.

32 Claims, No Drawings

(56) References Cited

OTHER PUBLICATIONS

Office Action issued in Eurasian Application No. 200970272 dated Nov. 19, 2010 (2 pages).
Office Action issued in Australian Application No. 2007296539 dated Feb. 4, 2011 (1 page).
Office Action issued in corresponding Egyptian Application No. 2009030220 dated Dec. 7, 2010 (4 pages).
Office Action issued in corresponding Egyptian Application No. 2009030320 dated Sep. 13, 2011 (4 pages).
Nils Kageson-Loe et al. Formation Damage Observations on Oil-based Fluid Systems Weighted with Treated Micronized Barite; Society of Petroleum Engineers, SPE 107802 (2007) pp. 1-10.
Gunnar Fimreite et al. Invert Emulsion Fluids for Drilling Through Narrow Hydraulic Windows, IADC/SPE 87128 Drilling Conference, pp. 1-14 (2004).

* cited by examiner

PRECIPITATED WEIGHTING AGENTS FOR USE IN WELLBORE FLUIDS

CROSS-REFERENCE TO RELATED APPLICATIONS

This application, pursuant to 35 U.S.C. §119, claims priority to U.S. Patent Application No. 60/825,156, filed Sep. 11, 2006, which is herein incorporated by reference in its entirety.

BACKGROUND OF INVENTION

1. Field of the Invention

Embodiments disclosed herein relate generally to wellbore fluids. In particular, embodiments disclosed herein relate to precipitated weighting agents for use in a wellbore fluid.

2. Background Art

When drilling or completing wells in earth formations, various fluids typically are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

In general, drilling fluids should be pumpable under pressure down through strings of drilling pipe, then through and around the drilling bit head deep in the earth, and then returned back to the earth surface through an annulus between the outside of the drill stem and the hole wall or casing. Beyond providing drilling lubrication and efficiency, and retarding wear, drilling fluids should suspend and transport solid particles to the surface for screening out and disposal. In addition, the fluids should be capable of suspending additive weighting agents (to increase specific gravity of the mud), generally finely ground barites (barium sulfate ore), and transport clay and other substances capable of adhering to and coating the borehole surface.

Drilling fluids are generally characterized as thixotropic fluid systems. That is, they exhibit low viscosity when sheared, such as when in circulation (as occurs during pumping or contact with the moving drilling bit). However, when the shearing action is halted, the fluid should be capable of suspending the solids it contains to prevent gravity separation. In addition, when the drilling fluid is under shear conditions and a free-flowing near-liquid, it must retain a sufficiently high enough viscosity to carry all unwanted particulate matter from the bottom of the well bore to the surface. The drilling fluid formulation should also allow the cuttings and other unwanted particulate material to be removed or otherwise settle out from the liquid fraction.

There is an increasing need for drilling fluids having the rheological profiles that enable these wells to be drilled more easily. Drilling fluids having tailored rheological properties ensure that cuttings are removed from the wellbore as efficiently and effectively as possible to avoid the formation of cuttings beds in the well which can cause the drill string to become stuck, among other issues. There is also the need from a drilling fluid hydraulics perspective (equivalent circulating density) to reduce the pressures required to circulate the fluid, this helps to avoid exposing the formation to excessive forces that can fracture the formation causing the fluid, and possibly the well, to be lost. In addition, an enhanced profile is necessary to prevent settlement or sag of the weighting agent in the fluid, if this occurs it can lead to an uneven density profile within the circulating fluid system which can result in well control (gas/fluid influx) and wellbore stability problems (caving/fractures).

To obtain the fluid characteristics required to meet these challenges, the fluid must be easy to pump so it requires the minimum amount of pressure to force it through restrictions in the circulating fluid system, such as bit nozzles or downhole tools. Or in other words, the fluid must have the lowest possible viscosity under high shear conditions. Conversely, in zones of the well where the area for fluid flow is large and the velocity of the fluid is slow or where there are low shear conditions, the viscosity of the fluid needs to be as high as possible in order to suspend and transport the drilled cuttings. This also applies to the periods when the fluid is left static in the hole, where both cuttings and weighting materials need to be kept suspended to prevent settlement. However, it should also be noted that the viscosity of the fluid should not continue to increase under static conditions to unacceptable levels. Otherwise when the fluid needs to be circulated again this can lead to excessive pressures that can fracture the formation or alternatively it can lead to lost time if the force required to regain a fully circulating fluid system is beyond the limits of the pumps.

Wellbore fluids must also contribute to the stability of the well bore, and control the flow of gas, oil or water from the pores of the formation in order to prevent, for example, the flow or blow out of formation fluids or the collapse of pressured earth formations. The column of fluid in the hole exerts a hydrostatic pressure proportional to the depth of the hole and the density of the fluid. High-pressure formations may require a fluid with a specific gravity as high as 3.0.

A variety of materials are presently used to increase the density of wellbore fluids. These include dissolved salts such as sodium chloride, calcium chloride and calcium bromide. Alternatively, powdered minerals such as barite, calcite and hematite are added to a fluid to form a suspension of increased density. The use of finely divided metal, such as iron, as a weight material in a drilling fluid wherein the weight material includes iron/steel ball-shaped particles having a diameter less than 250 microns and preferentially between 15 and 75 microns has also been described. The use of finely powdered calcium or iron carbonate has also been proposed; however, the plastic viscosity of such fluids rapidly increases as the particle size decreases, limiting the utility of these materials.

One requirement of these wellbore fluid additives is that they form a stable suspension and do not readily settle out. A second requirement is that the suspension exhibit a low viscosity in order to facilitate pumping and to minimize the generation of high pressures. Finally, the wellbore fluid slurry should also exhibit low fluid loss.

Conventional weighting agents such as powdered barite exhibit an average particle diameter ($d_{50}$) in the range of 10-30 microns. To adequately suspend these materials requires the addition of a gellant such as bentonite for water-based fluids, or organically modified bentonite for oil-based fluids. A soluble polymer viscosifier such as xanthan gum may be also added to slow the rate of the sedimentation of the weighting agent. However, as more gellant is added to increase the suspension stability, the fluid viscosity (plastic viscosity and/or yield point) increases undesirably resulting in reduced pumpability. This is also the case if a viscosifier is used to maintain a desirable level of solids suspension.

The sedimentation (or "sag") of particulate weighting agents becomes more critical in wellbores drilled at high angles from the vertical, in that a sag of, for example, one inch (2.54 cm) can result in a continuous column of reduced density fluid along the upper portion of the wellbore wall. Such high angle wells are frequently drilled over large distances in order to access, for example, remote portions of an oil reservoir. In such instances it is important to minimize a drilling fluid's plastic viscosity in order to reduce the pressure losses over the borehole length. At the same time a high density also should be maintained to prevent a blow out. Further, as noted above with particulate weighting materials the issues of sag become increasingly important to avoid differential sticking or the settling out of the particulate weighting agents on the low side of the wellbore.

Being able to formulate a drilling fluid having a high density and a low plastic viscosity is also important in deep high pressure wells where high-density wellbore fluids are required. High viscosities can result in an increase in pressure at the bottom of the hole under pumping conditions. This increase in "Equivalent Circulating Density" (ECD) can result in opening fractures in the formation, and serious losses of the wellbore fluid into the fractured formation. Again the stability of the suspension is important in order to maintain the hydrostatic head to avoid a blow out. The goal of high-density fluids with low viscosity plus minimal sag of weighting material continues to be a challenge.

According, there is a continuing need for improvements in wellbore fluids.

SUMMARY OF INVENTION

In one aspect, embodiments disclosed herein relate to a method of formulating a wellbore fluid that includes precipitating a weighting agent from a solution; and adding the precipitated weighting agent to a base fluid to form a wellbore fluid.

In another aspect, embodiments disclosed herein relate to a method of formulating a wellbore fluid that includes precipitating a weighting agent from a solution; coating the weighting agent with a dispersant; and adding the precipitated weighting agent to a base fluid to form a wellbore fluid.

In another aspect, embodiments disclosed herein related to a wellbore fluid, that includes a base fluid; and a precipitated weighting agent.

In yet another aspect, embodiments disclosed herein relate to a wellbore fluid that includes a wellbore fluid that includes a base fluid; and a precipitated weighting agent coated with a dispersant.

Other aspects and advantages of the invention will be apparent from the following description and the appended claims.

DETAILED DESCRIPTION

In one aspect, embodiments disclosed herein relate to precipitated weighting agents for use in a wellbore fluid. Additionally, methods of formulating and using fluids comprising precipitated weighting agents are also disclosed herein.

The source of conventional weighting agents, such as barite, is mined ore, which may be subjected to comminution (grinding) processes to produce particles having the desired particle size. Various particle sizes used in downhole operations may range, for example, from API-grade barite ($d_{90} \approx 70$ microns) to a micronized barite ($d_{90}=1$-25 microns). Additionally, as discussed in U.S. Patent Application Publication Nos. 20040127366, 20050101493, 20060188651, U.S. Pat. Nos. 6,586,372 and 7,176,165, and U.S. Provisional application Ser. No. 11/741,199, each of which is assigned to the present assignee and is hereby incorporated by reference, micronized weighting agents may provide improved performance in a fluid's sag, rheology, and/or fluid loss.

However, embodiments of the present disclosure provide for an alternative source of such weighting agents, by precipitation, which may also allow for a broader range of attainable particle sizes. As used herein, the term "precipitated weighting agents" refers to weighting agents formed synthetically from a solution by chemical precipitation, as compared to conventional weighting agents formed naturally and mined as a crude material and may be referred to as a primary mineral. "Primary minerals" such as primary barite, refers to the first marketable product, which include crude minerals as well as the products of simple benefication methods, such as washing, jigging, heavy media separation, tabling, flotation, and magnetic separation. However, for use in wells, the minerals are also crushed/ground and screened.

Precipitated weighting agents used in some embodiments disclosed herein may include a variety of precipitated forms of the typical weighting agent compounds known to one of skill in the art, which may include, for example, barium sulfate (barite), calcium carbonate (calcite), magnesium carbonate (magnesite), calcium magnesium carbonate (dolomite), iron oxide (hematite), magnesium and iron silicate (olivine), iron carbonate (siderite), and strontium sulfate (celestine). Additionally, as the weighting agents of the present disclosure are synthetically produced, one of ordinary skill in the art would appreciate that compounds other than those naturally formed as mineral ores may be formed by precipitation and used as weighting agents in the fluids of the present disclosure. Thus, in one embodiment, various sulfates, carbonates, silicates, phosphates, aluminosilicates, oxides, etc. of various metals and/or alkaline earth metals including, for example, calcium, barium, magnesium, iron, strontium, aluminum, and/or zinc, may be used. Further, while many alkali salts, such as sodium are fairly soluble, others, such as sodium aluminosilicate and/or sodium magnesium aluminosilicate, are fairly insoluble and thus may be used as alternative precipitated weighting agents in the fluids of the present disclosure.

One having ordinary skill in the art would recognize that selection of a particular precipitated weighting agent material may depend largely on the density of the material because, typically, the lowest wellbore fluid viscosity at any particular density is obtained by using the highest density particles. However, other considerations may influence the choice of product such as cost, local availability, and whether the residual solids or filter cake may be readily removed from the well.

In some embodiments, the precipitated weighting agent may be formed of particles that are composed of a material of specific gravity of at least 1.8; at least 2.3 in other embodiments; at least 2.4 in other embodiments; at least 2.5 in other embodiments; at least 2.6 in other embodiments; and at least 2.68 in yet other embodiments. For example, a weighting agent formed of particles having a specific gravity of at least 2.68 may allow wellbore fluids to be formulated to meet most density requirements yet have a particulate volume fraction low enough for the fluid to be pumpable.

In some embodiments, the average particle size ($d_{50}$) of the weighting agents may range from a lower limit of greater than 5 nm, 10 nm, 30 nm, 50 nm, 100 nm, 200 nm, 500 nm, 700 nm, 1 micron, 1.2 microns, 1.5 microns to an upper limit of less than 10 microns, 5 microns, 2.5 microns, 1.5 microns, 1 micron, 700 nm, 500 nm, 100 nm, where the particles may range from any lower limit to any upper limit. In other embodiments, the $d_{90}$ (the size at which 90% of the particles are smaller) of the weighting agents may range from a lower limit of greater than 20 nm, 50 nm, 100 nm, 200 nm, 500 nm, 700 nm, 1 micron, 1.2 microns, 1.5 microns, 3 microns, 5 microns to an upper limit of less than 25 microns, 15 microns, 10 microns, 5 microns, 2.5 microns, 1.5 microns, 1 micron, 700 nm, 500 nm, where the particles may range from any lower limit to any upper limit.

Further, one of ordinary skill in the art would recognize that the weighting agent may have a particle size distribution other than a monomodal distribution. That is, the weighting agent may have a particle size distribution that, in various embodiments, may be monomodal, which may or may not be Gaussian, bimodal, or polymodal.

Particles having these average particle sizes may be obtained by chemical precipitation, whereby insoluble solid weighting agents are produced as a result of a chemical reaction between chemical species in a solution. Precipitation occurs following the mixing of at least two chemical specific in solution. One of ordinary skill in the art would appreciate that the chemical identity of those chemicals mixed would depend on the desired resulting compound to be used as a weighting agent. For example, when a barium sulfate weighting agent is desired, a barium salt solution (e.g., barium hydroxide, barium chloride, etc) may be mixed with an alkali sulfate salt solution (e.g., sodium sulfate, sulfuric acid) to precipitate barium sulfate. However, where a carbonate, such as calcium carbonate is desired, a calcium hydroxide solution combined with carbon dioxide results in the formation of calcium carbonate. Other sulfates and carbonates may be similarly formed by replacing the alkaline metal salt solution with another alkaline metal (or other metal) salt solution, while silicates may be formed by replacing sulfate salt solution with a silicate salt solution, such as sodium silicate). Further, for precipitation of other compounds such as ferric oxide, ferric oxide may be precipitated from an iron salt solution by exposing the solution to elevated temperatures and pressures to hydrolyze the iron in solution and precipitate out.

Mixing may occur, for example, in stirred tank reactors (batch or continuous), static or rotor-stator mixers. Devices in which the rotor rotates at a high speed (such as at least 120000 rpm are particularly suitable for use in forming such precipitated weighting agents because the shear, transverse, and frictional forces of intermeshing tools (in combination with high speeds) may result in the formation of fine, dispersed particles. Additional techniques such as the application of impinging jets, micro-channel mixers, or the use of a Taylor-Couette reactor may improve the mixing intensity and result in smaller particles and better particle homogeneity. Alternatively, ultrasonication, which may provide higher shear and stirring energy to induce micromixing and dissipate high power locally, may also provide smaller particles and better particle homogeneity by allowing for control of various parameters, such as power input, reactor design, residence time, particle, or reactant concentration independently. After the solution has passed through the mixer, the resulting precipitated weighting agents may be separated out and dried for later use in a wellbore fluid. A particular mixer that may be used when nano-sized weighting agents are desired is discussed in U.S. Pat. No. 7,238,331, which is herein incorporated by reference in its entirety.

As discussed above, fluids used in embodiments disclosed herein may include precipitated weighting agents. In some embodiments, the precipitated weighting agents may be uncoated. In other embodiments, the precipitated weighting agents may be coated with a dispersant or wetting agent. For example, fluids used in some embodiments disclosed herein may include dispersant coated precipitated weighting agents. The coating of the surface of the precipitated weighting agents may occur during the precipitation, after the precipitation, or both during and after the precipitation. Inclusion of such coating may be desirable to prevent agglomeration of the particles, and which may also provide desirable rheological effects on the wellbore fluid in which the particles are used. As that term is used in herein, "coating of the surface" is intended to mean that a sufficient number of dispersant molecules are absorbed (physically or chemically) or otherwise closely associated with the surface of the particles so that the fine particles of material do not cause the rapid rise in viscosity observed in the prior art. By using such a definition, one of skill in the art should understand and appreciate that the dispersant molecules may not actually be fully covering the particle surface and that quantification of the number of molecules is very difficult. Therefore, by necessity, reliance is made on a results oriented definition. As a result of the process, one can control the colloidal interactions of the fine particles by coating the particle with dispersants prior to addition to the drilling fluid. By doing so, it is possible to systematically control the rheological properties of fluids containing in the additive as well as the tolerance to contaminants in the fluid in addition to enhancing the fluid loss (filtration) properties of the fluid.

In some embodiments, the precipitated weighting agents include solid colloidal particles having a deflocculating agent or dispersant coated onto the surface of the particle. The precipitated particle size may allow for high density suspensions or slurries that show a reduced tendency to sediment or sag, while the dispersant on the surface of the particle controls the inter-particle interactions resulting in lower rheological profiles. Thus, the combination of high density, fine particle size, and control of colloidal interactions by surface coating the particles with a dispersant reconciles the objectives of high density, lower viscosity and minimal sag.

In some embodiments, the weighting agents include dispersed solid colloidal particles with a weight average particle diameter ($d_{50}$) of less than 10 microns that are coated with a polymeric deflocculating agent or dispersing agent. In other embodiments, the weighting agents include dispersed solid colloidal particles with a weight average particle diameter ($d_{50}$) of less than 8 microns that are coated with a polymeric deflocculating agent or dispersing agent; less than 6 microns in other embodiments; less than 4 microns in other embodiments; and less than 2 microns in yet other embodiments. The fine particle size will generate suspensions or slurries that will show a reduced tendency to sediment or sag, and the polymeric dispersing agent on the surface of the particle may control the inter-particle interactions and thus will produce lower rheological profiles. It is the combination of fine particle size and control of colloidal interactions that reconciles the two objectives of lower viscosity and minimal sag.

Coating of the precipitated weighting agent with the dispersant may be achieved by adding the disperant to the solution prior to mixing. Thus, as mixing and precipitation occurs, the particles are coated. The presence of the dispersant during the mixing and precipitation may also provide for inhibition of grain growth of the particles if ultra-fine or nano-sized weighting agents are desired, and also prevention of particle agglomeration.

Coating of the precipitated weighting agent with the dispersant may also be performed in a dry blending process following precipitation such that the process is substantially free of solvent. The process includes blending the precipitated weighting agent and a dispersant at a desired ratio to form a blended material. The blended material may then be fed to a heat exchange system, such as a thermal desorption system. The mixture may be forwarded through the heat exchanger using a mixer, such as a screw conveyor. Upon cooling, the polymer may remain associated with the weighting agent. The polymer/weighting agent mixture may then be separated into polymer coated weighting agent, unassociated polymer, and any agglomerates that may have formed. The unassociated polymer may optionally be recycled to the beginning of the process, if desired. In another embodiment, the dry blending process alone may serve to coat the weighting agent without heating.

Alternatively, a precipitated weighting agent may be coated by thermal adsorption as described above, in the absence of a dry blending process. In this embodiment, a process for making a coated substrate may include heating a precipitated weighting agent to a temperature sufficient to react monomeric dispersant onto the weighting agent to form a polymer coated sized weighting agent and recovering the polymer coated weighting agent. In another embodiment, one may use a catalyzed process to form the polymer in the presence of the sized weighting agent. In yet another embodiment, the polymer may be preformed and may be thermally adsorbed onto the sized weighting agent.

As mentioned above, embodiments of the micronized weighting agent may include a deflocculating agent or a dispersant. In one embodiment, the dispersant may be selected from carboxylic acids of molecular weight of at least 150 Daltons, such as oleic acid and polybasic fatty acids, alkylbenzene sulphonic acids, alkane sulphonic acids, linear alpha-olefin sulphonic acids, phospholipids such as lecithin, ether sulfonates, polyethers, including salts thereof and including mixtures thereof Synthetic polymers may also be used, such as HYPERMER OM-I (Imperial Chemical Industries, PLC, London, United Kingdom) or polyacrylate esters, for example. Such polyacrylate esters may include polymers of stearyl methacrylate and/or butylacrylate. In another embodiment, the corresponding acids methacrylic acid and/or acrylic acid may be used. One skilled in the art would recognize that other acrylate or other unsaturated carboxylic acid monomers (or esters thereof) may be used to achieve substantially the same results as disclosed herein.

When a dispersant coated micronized weighting agent is to be used in water-based fluids, a water soluble polymer of molecular weight of at least 2000 Daltons may be used in a particular embodiment. Examples of such water soluble polymers may include a homopolymer or copolymer of any monomer selected from acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate or salts thereof.

The polymeric dispersant may have an average molecular weight from about 10,000 Daltons to about 300,000 Daltons in one embodiment, from about 17,000 Daltons to about 40,000 Daltons in another embodiment, and from about 200,000-300,000 Daltons in yet another embodiment. One of ordinary skill in the art would recognize that when the dispersant is added to the weighting agent during a grinding process, intermediate molecular weight polymers (10,000-300,000 Daltons) may be used.

Further, it is specifically within the scope of the embodiments disclosed herein that the polymeric dispersant be polymerized prior to or simultaneously with the wet or dry blending processes disclosed herein. Such polymerizations may involve, for example, thermal polymerization, catalyzed polymerization, initiated polymerization or combinations thereof.

Given the particulate nature of the precipitated and dispersant coated precipitated weighting agents disclosed herein, one of skill in the art should appreciate that additional components may be mixed with the weighting agent to modify various macroscopic properties. For example, anti-caking agents, lubricating agents, and agents used to mitigate moisture build-up may be included. Alternatively, solid materials that enhance lubricity or help control fluid loss may be added to the weighting agents and drilling fluid disclosed herein. In one illustrative example, finely powdered natural graphite, petroleum coke, graphitized carbon, or mixtures of these are added to enhance lubricity, rate of penetration, and fluid loss as well as other properties of the drilling fluid. Another illustrative embodiment utilizes finely ground polymer materials to impart various characteristics to the drilling fluid. In instances where such materials are added, it is important to note that the volume of added material should not have a substantial adverse impact on the properties and performance of the drilling fluids. In one illustrative embodiment, polymeric fluid loss materials comprising less than 5 percent by weight are added to enhance the properties of the drilling fluid. Alternatively, less than 5 percent by weight of suitably sized graphite and petroleum coke are added to enhance the lubricity and fluid loss properties of the fluid. Finally, in another illustrative embodiment, less than 5 percent by weight of a conventional anti-caking agent is added to assist in the bulk storage of the weighting materials.

The particulate materials as described herein (i.e., the coated and/or uncoated precipitated weighting agents) may be added to a drilling fluid as a weighting agent in a dry form or concentrated as slurry in either an aqueous medium or as an organic liquid. As is known, an organic liquid should have the necessary environmental characteristics required for additives to oil-based drilling fluids. With this in mind, the oleaginous fluid may have a kinematic viscosity of less than 10 centistokes (10 $mm^2/s$) at 40° C. and, for safety reasons, a flash point of greater than 60° C. Suitable oleaginous liquids are, for example, diesel oil, mineral or white oils, n-alkanes or synthetic oils such as alpha-olefin oils, ester oils, mixtures of these fluids, as well as other similar fluids known to one of skill in the art of drilling or other wellbore fluid formulation.

Wellbore Fluid Formulation

The precipitated particles described above may be used in any wellbore fluid such as drilling, cementing, completion, packing, work-over (repairing), stimulation, well killing, spacer fluids, and other uses of high density fluids, such as in a dense media separating fluid or in a ship's or other vehicle's ballast fluid. Such alternative uses, as well as other uses, of the present fluid should be apparent to one of skill in the art given the present disclosure. In accordance with one embodiment, the weighting agents may be used in a wellbore fluid formulation. The wellbore fluid may be a water-based fluid, a direct emulsion, an invert emulsion, or an oil-based fluid.

Water-based wellbore fluids may have an aqueous fluid as the base liquid and a precipitated weighting agent (coated or uncoated). Water-based wellbore fluids may have an aqueous fluid as the base fluid and a precipitated weighting agent. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oil-based/invert emulsion wellbore fluids may include an oleaginous continuous phase, a non-oleaginous discontinuous phase, and a precipitated weighting agent. One of ordinary skill in the art would appreciate that the micro precipitated weighting agents described above may be modified in accordance with the desired application. For example, modifications may include the hydrophilic/hydrophobic nature of the dispersant.

The oleaginous fluid may be a liquid, more preferably a natural or synthetic oil, and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. The concentration of the oleaginous fluid should be sufficient so that an invert emulsion forms and may be less than about 99% by volume of the invert emulsion. In one embodiment, the amount of oleaginous fluid is from about 30% to about 95% by volume and more preferably about 40% to about 90% by volume of the invert emulsion fluid. The oleaginous fluid, in one embodiment, may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and may be an aqueous liquid. In one embodiment, the non-oleaginous liquid may be selected from the group including sea water, a brine containing organic and/or inorganic dissolved salts, liquids containing water-miscible organic compounds, and combinations thereof. The amount of the non-oleaginous fluid is typically less than the theoretical limit needed for forming an invert emulsion. Thus, in one embodiment, the amount of non-oleaginous fluid is less that about 70% by volume, and preferably from about 1% to about 70% by volume. In another embodiment, the non-oleaginous fluid is preferably from about 5% to about 60% by volume of the invert emulsion fluid. The fluid phase may include either an aqueous fluid or an oleaginous fluid, or mixtures thereof. In a particular embodiment, coated barite or other micronized weighting agents may be included in a wellbore fluid having an aqueous fluid that includes at least one of fresh water, sea water, brine, and combinations thereof.

Conventional methods can be used to prepare the drilling fluids disclosed herein in a manner analogous to those normally used, to prepare conventional water- and oil-based drilling fluids. In one embodiment, a desired quantity of water-based fluid and a suitable amount of one or more precipitated weighting agents, as described above, are mixed together and the remaining components of the drilling fluid added sequentially with continuous mixing. In another embodiment, a desired quantity of oleaginous fluid such as a base oil, a non-oleaginous fluid, and a suitable amount of one or more precipitated weighting agents are mixed together and the remaining components are added sequentially with continuous mixing. An invert emulsion may be formed by vigorously agitating, mixing, or shearing the oleaginous fluid and the non-oleaginous fluid.

In yet another embodiment, the precipitated products of the present disclosure may be used alone or in combination with conventional mechanically milled weighting agents. Other additives that may be included in the wellbore fluids disclosed herein include, for example, wetting agents, organophilic clays, viscosifiers, fluid loss control agents, surfactants, dispersants, interfacial tension reducers, pH buffers, mutual solvents, thinners, thinning agents, and cleaning agents. The addition of such agents should be well known to one of ordinary skill in the art of formulating drilling fluids and muds.

Advantageously, embodiments of the present disclosure for wellbore fluids that may possess high density without sacrificing rheology and/or risk of sag. One characteristic of the fluids used in some embodiments disclosed herein is that the particles form a stable suspension, and do not readily settle out. A further desirable characteristic of the fluids used in some embodiments disclosed herein is that the suspension exhibits a low viscosity under shear, facilitating pumping and minimizing the generation of high pressures and chances of fluid losses or fluid influxes. Further, by using a bottoms up approach as compared to the traditional top down approach, fine particles may be achieved without requiring the energy intensive approach of grinding, and in particular nano-size weighting agents which were not otherwise realistically attainable may be produced. Additionally, where some mineral ores may be rare, costly, or risking depletion, the methods of the present disclosure may allow for a wellbore fluid to be formulated irrespective of such concerns. Further, it is also noted that as crude mineral ore may contain impurities, which may reduce the specific gravity of the weighting agents, a reduction in impurities (and thus increase in actual specific gravity) may result by synthetically forming the weighting agents in a more controllable environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:
1. A method, comprising:
   precipitating a weighting agent from a solution in the presence of a dispersant to form a precipitated weighting agent having a $d_{50}$ of less than 700 nanometers wherein the precipitated weighting agent comprises at least one of barium sulfate, calcium carbonate, magnesium carbonate, calcium magnesium carbonate, iron oxide, magnesium silicate, iron silicate, iron carbonate, and strontium sulfate;

adding the precipitated weighting agent to a base fluid to form a wellbore fluid; and
circulating the wellbore fluid into a wellbore.

2. The method of claim 1, wherein the precipitating comprises mixing a metal or an alkaline metal salt solution with at least one of a sulfate salt solution, carbon dioxide, or precipitating phosphate or silicate solutions.

3. The method of claim 1, wherein the precipitated weighting agent has an average particle size of less than 500 nm.

4. The method of claim 3, wherein the precipitated weighting agent has an average particle size of less than 100 nm.

5. The method of claim 1, further comprising: drilling a well with the wellbore fluid.

6. The method of claim 1, wherein the base fluid is one selected from a water-based fluid, an oil-based fluid, and an invert emulsion.

7. The method of claim 1, wherein the dispersant comprises at least one selected from oleic acid, polybasic fatty acids, alkylbenzene sulfonic acids, alkane sulfonic acids, linear alpa olefins sulfonic acid, alkaline earth metal salts thereof, and phospholipids.

8. The method of claim 1, wherein the dispersant comprises polyacrylate esters.

9. The method of claim 8, wherein the polyacrylate ester is at least one selected from polymers of stearyl methacrylate, butylacrylate, and acrylic acid.

10. The method of claim 1, wherein the dispersant comprises a homopolymer or copolymer of one or more monomers selected from acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether or vinyl acetate or salts thereof.

11. A method, comprising:
circulating a wellbore fluid into a wellbore, the wellbore fluid comprising a base fluid and a precipitated weight agent, the precipitated weighting agent formed by:
precipitating a weighting agent from a solution;
controlling the particle size of the precipitated weighting agent to $d_{50}$ of less than 700 nanometers wherein the precipitated weighting agent comprises at least one of barium sulfate, calcium carbonate, magnesium carbonate, calcium magnesium carbonate, iron oxide, magnesium silicate, iron silicate, iron carbonate, and strontium sulfate and dispersing the precipitated weighting agent.

12. The method of claim 11, wherein the controlling comprises adding a dispersant to the solution during the precipitating.

13. The method of claim 11, wherein the controlling comprises precipitating in the presence of at least one of a stirred tank reactor, a rotor-stator mixer, impinging jets, micro-channel mixers, a Taylor-Couette reactor, or ultrasonication.

14. The method of claim 12, wherein the dispersant comprises at least one selected from oleic acid, polybasic fatty acids, alkylbenzene sulfonic acids, alkane sulfonic acids, linear alpa olefins sulfonic acid, alkaline earth metal salts thereof, and phospholipids.

15. The method of claim 12, wherein the dispersant comprises polyacrylate esters.

16. The method of claim 15, wherein the polyacrylate ester is at least one selected from polymers of stearyl methacrylate, butylacrylate, and acrylic acid.

17. The method of claim 11, wherein the precipitated weighting agent has an average particle size of less than 500 mm.

18. The method of claim 17, wherein the precipitated weighting agent has an average particle size of less than 100 nm.

19. A method, comprising:
circulating a wellbore fluid into a wellbore, the wellbore fluid comprising a base fluid and a precipitated weighting agent comprising at least one of barium sulfate, calcium carbonate, magnesium carbonate, calcium magnesium carbonate, iron oxide, magnesium silicate, iron silicate, iron carbonate, and strontium sulfate, the precipitated weighting agent formed by the process of:
dispersing and precipitating a weighting agent from a solution in the presence of at least one of a stirred tank reactor, a rotor-stator mixer, impinging jets, microchannel mixers, a Taylor-Couette reactor, or ultrasonication.

20. The method of claim 19, wherein the precipitated weighting agent has an average particle size of less than 700 nm.

21. The method of claim 20, wherein the precipitated weighting agent has an average particle size of less than 500 nm.

22. The method of claim 19, further comprising: drilling a well with the wellbore fluid.

23. A method, comprising:
circulating a wellbore fluid into a wellbore, the wellbore fluid comprising a base fluid and a a precipitated weighting agent comprising at least one of barium sulfate, calcium carbonate, magnesium carbonate, calcium magnesium carbonate, iron oxide, magnesium silicate, iron silicate, iron carbonate, and strontium sulfate made by the process of:
precipitating the precipitated weighting agent from a solution in the presence of a dispersant to form a precipitated weighting agent having a $d_{50}$ of less than 1 micron.

24. The method of claim 23, wherein the precipitating comprises mixing a metal or an alkaline metal salt solution with at least one of a sulfate salt solution, carbon dioxide, or precipitating phosphate or silicate solutions.

25. The method of claim 23, wherein the precipitated weighting agent has an average particle size of less than 700 nm.

26. The method of claim 25, wherein the precipitated weighting agent has an average particle size of less than 500 nm.

27. The method of claim 23, further comprising: drilling a well with the wellbore fluid.

28. The method of claim 23, wherein the base fluid is one selected from a water-based fluid, an oil-based fluid, and an invert emulsion.

29. The method of claim 23, wherein the dispersant comprises at least one selected from oleic acid, polybasic fatty acids, alkylbenzene sulfonic acids, alkane sulfonic acids, linear alpa olefins sulfonic acid, alkaline earth metal salts thereof, and phospholipids.

30. The method of claim 23, wherein the dispersant comprises polyacrylate esters.

31. The method of claim 30, wherein the polyacrylate ester is at least one selected from polymers of stearyl methacrylate, butylacrylate, and acrylic acid.

32. The method of claim 23, wherein the dispersant comprises a homopolymer or copolymer of one or more monomers selected from acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether or vinyl acetate or salts thereof.

* * * * *